United States Patent [19]

Bito et al.

[11] Patent Number: 5,246,616
[45] Date of Patent: Sep. 21, 1993

[54] PROCESS FOR PRODUCING PARTICLES OF CROSSLINKED MELAMINE RESIN HAVING A UNIFORM PARTICLE DIAMETER

[75] Inventors: Masami Bito, Chigasaki; Satoshi Konishi; Fumimasa Fukazawa, both of Fujisawa, all of Japan

[73] Assignee: Honen Corporation, Tokyo, Japan

[21] Appl. No.: 651,934

[22] Filed: Feb. 7, 1991

[30] Foreign Application Priority Data

Feb. 19, 1990 [JP] Japan .................................. 2-37744

[51] Int. Cl.$^5$ ................. C08L 33/26; C08L 33/20; C08L 61/28; C08L 61/32
[52] U.S. Cl. ................. 525/163; 525/238; 525/221; 525/218
[58] Field of Search ............ 525/163, 238, 218, 221

[56] References Cited

U.S. PATENT DOCUMENTS

| | | | |
|---|---|---|---|
| 4,049,607 | 9/1977 | Berghoff | 525/163 |
| 4,711,749 | 12/1987 | Kosaka et al. | 503/215 |

FOREIGN PATENT DOCUMENTS

| | | |
|---|---|---|
| 0415273 | 3/1991 | European Pat. Off. |
| 2375903 | 7/1978 | France . |
| 2073132 | 3/1981 | United Kingdom . |

OTHER PUBLICATIONS

*Amino Resins*, John F. Blais, Reinhold Publishing Corp., New York, 1959, pp. 20-21, 52-53.
Chemical Patents Index, Basic Abstracts Journal, Week 9022, Jul. 25, 1990, Derwent Publications Ltd., London, GB—164412.

*Primary Examiner*—Ana L. Carrillo
*Assistant Examiner*—W. R. H. Clark
*Attorney, Agent, or Firm*—Oliff & Berridge

[57] ABSTRACT

A process for producing the particles of crosslinked melamine resin having a uniform diameter in the following manner that water soluble precondensate of methyletherified melamine resin undergoes condensation reaction to give particles of crosslinked melamine resin having a uniform diameter, the condensation reaction is performed in an aqueous solution adjusted to a certain pH at 20° to 70° C., the aqueous solution contains a copolymer of acrylamide or methacrylamide with acrylic acid or methacrylic acid, a partial hydrolyzate of acrylamide or methacrylamide, or a saponified product of acrylonitrile, the pH adjustment is accomplished by an organic acid such as acetic acid, oxalic acid, formic acid, and p-toluenesulfonic acid, or an inorganic acid such as sulfuric acid and hydrochloric acid, which functions as a curing agent, and the preferred pH is in the range of 5 to 8.

9 Claims, 1 Drawing Sheet

PROCESS FOR PRODUCING PARTICLES OF CROSSLINKED MELAMINE RESIN HAVING A UNIFORM PARTICLE DIAMETER

BACKGROUND OF THE INVENTION

1. Field of the Invention

The present invention relates to a process for economically producing particles of crosslinked melamine resin having a uniform particle diameter. The particles will find use as an organic filler, slip agent for plastics film, and spacer for liquid crystal display units.

2. Description of Prior Art

It is known that particles of thermoplastic resin having a uniform particle diameter can be produced by the emulsion polymerization of vinyl monomer, as disclosed in Japanese Patent Laid-open No. Sho 59-59741 (59741/1984). These particles, however, are inherently poor in heat resistance and solvent resistance and hence are used only in extremely limited application areas.

For the production of particles of thermosetting resin, there have been proposed several processes. For example, Japanese Patent Publication No. Sho 62-18564 (18564/1987) discloses a process for producing fine spherical particles (0.005–100 μm in diameter) of cured resin by the spray-drying or precipitation with stirring of a solution of an amino acid-modified product or precondensate of methylol melamine. Japanese Patent Publication No. Sho 62-20212 (20212/1987) discloses a process for producing clear, fine spherical particles of amino resin by mixing a precondensate of amino compound and formalin with a non-solvent in the presence of a dye. Japanese Patent Laid-open No. Sho 62-68811 (68811/1987) discloses a process which consists of performing condensation and curing on an aqueous precondensate of melamine and/or benzoguanamine and formaldehyde in the presence of alkylbenzenesulfonic acid in an aqueous solution containing a surface active agent, thereby giving an emulsion, and separating and drying the cured resin. Japanese Patent Publication No. Sho 56-42614 (42614/1981) discloses a process which consists of reacting benzoguanamine or a mixture of benzoguanamine and melamine with formaldehyde to give a soluble, fusible resin, immersing the resin in stirred water containing a protective colloid at 40° to 60° C. for 1 hour, and curing the resin at 60° to 200° C.

As mentioned above, emulsion polymerization merely gives rise to resin particles having poor heat resistance and solvent resistance.

Particles of thermosetting resin are superior in heat resistance and solvent resistance. Nevertheless, their production poses many problems. For example, the process needs a comparatively expensive raw material such as amino acid and also needs a spray dryer and high-speed stirrer. The process is inefficient because it has to be performed in a dilute solution and hence it gives rise to only a small amount of particles for the amount of solution processed and gives rise to the desired uniform particles only at a high production cost. In another case, the process needs a solvent in place of water and gives rise to comparatively coarse particles having uneven particle diameters. Moreover, the process needs an expensive raw material such as benzoguanamine and a special curing agent. In this case, the process is inefficient and uneconomical due to the dilute solution that can be processed. The process also needs a special stirrer such as colloid mill, homomixer, and disperse mill. All this is disadvantageous to the simple, economical production of the desired particles.

SUMMARY OF THE INVENTION

The present invention was completed to address the above-mentioned problems associated with the prior art technology.

An object of the present invention is to provide a process for economically producing particles of crosslinked melamine resin having a uniform particle diameter which are superior in heat resistance and solvent resistance.

In order to produce particles of crosslinked melamine resin having a uniform diameter, the present inventors carried out extensive studies, which led to the finding that the object is achieved by a process which comprises subjecting a water-soluble melamine-formaldehyde-methanol precondensate to condensation reaction in the presence of a curing catalyst such as an organic acid in an aqueous solution containing a water-soluble polymer with carboxyl groups or a water-soluble copolymer of ethylenically unsaturated carboxylic acid.

In other words, the present invention was completed on the basis of findings that the particles of crosslinked melamine resin having a uniform diameter can be obtained in high concentrations when a melamine-formaldehyde precondensate which has been methyl-etherified more than 10% with methanol undergoes condensation at a certain reaction rate by the aid of a readily available protective colloid selected from carboxyl group-containing polymers such as a copolymer of acrylamide or methacrylamide with acrylic acid or methacrylic acid, a partial hydrolyzate of acrylamide and/or methacrylamide, and a saponified product of acrylonitrile.

Thus, according to the present invention, particles of crosslinked melamine resin having a uniform particle diameter, free of agglomeration can be economically provided. They do not dissolve and swell in alcohols such as methanol and ethanol and organic solvents such as xylene, toluene, ethyl acetate, and acetone. In addition, they do not melt and stick during heat treatment at 200° C. Because of these characteristic properties, they will find use as an organic filler, slip agent for plastics film, and spacer for liquid crystal display units, in various application areas.

DETAILED DESCRIPTION OF THE INVENTION

Figure 1:
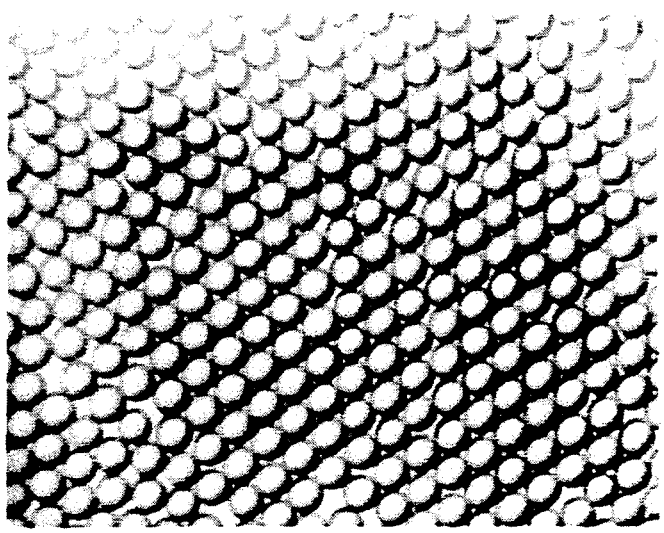
FIG. 1 is a micrograph showing the structure of the particles of crosslinked melamine resin obtained in Example 1.

According to the present invention, the particles of crosslinked melamine resin having a uniform diameter are produced in the following manner. A water-soluble precondensate of methyl-etherified melamine resin undergoes condensation reaction to give particles of crosslinked melamine resin having a uniform diameter. The precondensate is one which is readily available and commonly used as a fiber treatment or paper reinforcer.

The condensation reaction is performed in an aqueous solution adjusted to a certain pH at 20° to 70° C. The aqueous solution contains a copolymer of acrylamide or methacrylamide with acrylic acid or methacrylic acid, a partial hydrolyzate of acrylamide or methacrylamide, or a saponified product of acrylonitrile, which are commonly used as polymeric flocculating agents or internal paper reinforcers. The pH adjustment is accomplished by an organic acid such as acetic acid, oxalic acid, formic acid, and p-toluenesulfonic acid, or an inorganic acid such as sulfuric acid and hydrochloric acid, which functions as a curing agent. The preferred pH is in the ranges of 5 to 8. The reaction temperature is easy to attain.

As mentioned above, the process of the present invention employs a water-soluble melamine-formaldehyde-methanol precondensate. It may be a commercially available methyl etherified melamine resin used for fiber treatment, as explained above. It may also be a water-soluble precondensate obtained in the usual way which has a degree of methyl etherification higher than 10% which is defined as the ratio (%) of the number of methyl ether groups to the total amount of the number of methylol groups formed by the reaction of melamine and formaldehyde, methyl ether groups formed by the reaction of methylol group with methanol, and unreacted amino groups in melamine. The degree of methyl etherification is determined by $^{13}$C-NMR according to the procedure reported by B. Tomita and H. Ono, J. Polym. Sci. Polym. Chem. Ed., 17, 3205 (1979). With a precondensate which is not methyl etherified or has a degree of methyl etherification lower than 10%, it is difficult to produce particles having a uniform particle diameter because of the excessively fast condensation reaction. Incidentally, formaldehyde may be used in the form of formalin, trioxane, or paraformaldehyde which generates formaldehyde.

The process of the present invention employs, as a protective colloid, a water-soluble copolymer of ethylenically unsaturated carboxylic acid monomer, a preferred example of which is a copolymer of acrylic acid or methacrylic acid or a sodium salt thereof with acrylamide or methacrylamide. The copolymer may contain additional comonomers, e.g., vinyl monomer, other than the above-mentioned monomers in an amount not harmful to its water solubility. Further, examples of such comonomers include maleic acid, vinylsulfonic acid, itaconic acid or salts thereof, N-methylolacrylamide, hydroxyethyl acrylate, and vinylpyrrolidone, which give rise to water-soluble polymers, and styrene, acrylonitrile, and methyl methacrylate, which give rise to water-insoluble polymers. However, the above-specified water-soluble copolymer cannot be replaced by a carboxyl group-free polymer such as acrylamide homopolymer and methacrylamide homopolymer or a commonly used water-soluble polymer such as polyvinyl alcohol and CMC. They will not help produce the particles of crosslinked melamine resin having a uniform particle diameter but they will cause agglomeration or stick to the reactor wall during reaction, giving rise to coarse irregular particles, if the reaction liquid contains more than 10% solids.

The protective colloid should be used in an amount of 0.01 to 30 parts by weight, preferably 0.1 to 5 parts by weight, for 100 parts by weight of the water-soluble melamine-formaldehyde-methanol precondensate. With an amount in excess of 30 parts by weight, the protective colloid cannot be uniformly mixed with reactants by simple stirring, and such a large amount of protective colloid leads to a high production cost which is contrary to the object of the present invention. Incidentally, the protective colloid may be used in the form of previously prepared aqueous solution.

The process of the present invention employs, as a curing catalyst, an acid which includes carboxylic acids such as oxalic acid, formic acid, acetic acid, succinic acid, malic acid, citric acid, and tartaric acid and ammonium salts thereof, sulfonic acids such as paratoluenesulfonic acid and metaxylenesulfonic acid, and inorganic acids such as hydrochloric acid, sulfuric acid, and nitric acid and ammonium salts thereof. Preferable among them are carboxylic acids such as oxalic acid, formic acid, and acetic acid which permits the easy pH adjustment of the aqueous solution. They should preferably be used in the form of a previously prepared aqueous solution. The carboxylic acids may be used in combination with other acids or ammonium salts thereof.

The process of the present invention should be performed at pH 5 to 8. When the pH is less than 5.0, the reaction proceeds too fast to give particles having a uniform diameter. When the pH is more than 8.0, the reaction is too slow to give the desired particles at a reasonable cost in a simple manner. The process of the present invention should be performed at 20° to 70° C., preferably 40° to 60° C. With a temperature lower than 20° C., the reaction is too slow to give the desired particles within a reasonable period of time. With a temperature higher than 70° C., the reaction proceeds too fast to give particles having a uniform diameter.

According to the process of the present invention, the reaction liquid should contain solids in an amount more than 10 wt %, preferably 10 to 50 wt %, so that the condensation reaction proceeds to give particles of crosslinked melamine resin. The solids mean the water-soluble precondensate of melamine, formaldehyde, and methanol which forms the particles of crosslinked melamine resin. The amount of the solids is defined as the residue which remains after the solution of condensed resin has been heated at 105° C. for 3 hours. With solids less than 10 wt %, the process needs a large amount of solvent for reaction. Using a large amount of solvent needs waste liquid treatment even though the solvent is water. Moreover, using a large amount of solvent results in, after reaction, a suspension containing particles in low concentrations, which has to be concentrated even in the case where the suspension is used as such. This is contrary to the object of the present invention which is to produce the particles economically in a simple manner. Needless to say, a dilute suspension is undesirable in the case where the particles are to be obtained in powder form, because it needs waste liquid treatment and drying. All this is contrary to the object of the present invention.

The process of the present invention should be performed in water as a solvent. Other solvents than water that can be used include water-miscible solvents such as methanol, ethanol, diethylene glycol, and glycerin.

The present invention will be described in more detail with reference to the following examples.

EXAMPLE 1

In a four-neck flask equipped with a stirrer, reflux condenser, thermometer, and nitrogen blow inlet were placed 1275 parts by weight of water, 75 parts by weight of methacrylic acid, 150 parts by weight of acrylamide, and 96 parts by weight of 25% NaOH aqueous solution. The reactants were stirred for 30 minutes with nitrogen gas blowing. When the temperature of the reaction mixture was raised to 35° C., and ammonium persulfate and sodium hydrogen sulfite as polymerization initiators were added, and polymerization was carried out for a prescribed period of time. Thus there was obtained a copolymer in the form of a clear viscous aqueous solution which contained 16% evaporation residue after treatment at 105° C. for 3 hours.

In a four-neck flask equipped with a simple stirrer, reflux condenser, and thermometer were placed 13 parts by weight of the copolymer aqueous solution, 780 parts by weight of water, and 400 parts by weight of methyl etherified melamine resin for fiber treatment (ML-725, containing 73% solids and having a degree of methyl etherification of about 50%, made by Honen Corporation). After mild stirring at 50 to 100 rpm, the resulting aqueous solution was adjusted to pH 5.8 with 2.8 ml of 50% aqueous solution of acetic acid. With the temperature raised to 60° C., condensation reaction was carried out for 3 hours. Thus there was obtained a suspension of particles of crosslinked melamine resin having a uniform diameter of 10 $\mu$m. The solids content in the reaction liquid was 24.4%, and the amount of the protective colloid was 0.7 wt % based on solids of ML-725. The suspension was filtered and the separated filter cake was dried and ground. Thus there was obtained 220 parts by weight of particles of crosslinked melamine resin having uniform particle diameter (in powder form). The particles had the structure as shown by a micrograph in FIG. 1. The micrograph (x 400) was taken using a differential interference microscope (BH-2, made by Olympus Co., Ltd.) which creates a three-dimensional image. This is to be repeated in the following.

EXAMPLE 2

The procedure for reaction in Example 1 was repeated except that the melamine resin (ML-725 made by Honen Corporation) was replaced by 400 parts by weight of a melamine resin containing 80% solids and having a degree of methyl etherification of about 35% prepared by the process mentioned in "Polymer Experiments", vol. 5, "Polycondensation and Polyaddition", pp. 490-491, compiled by S. Kanbara (published by Kyoritsu Shuppan). Thus there was obtained 250 parts by weight of particles of crosslinked melamine resin in powder form having a uniform particle diameter of 12 $\mu$m. The solids content in the reaction liquid was 26.7%, and the amount of the protective colloid was 0.65 wt % of solids of the melamine resin.

EXAMPLE 3

Figure 2:
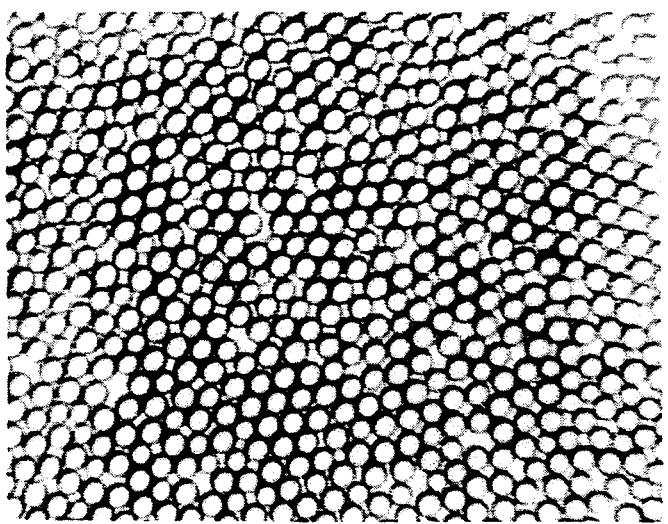
FIG. 2 is a micrograph showing the structure of the particles of crosslinked melamine resin obtained in Example 3.

The procedure for reaction in Example 1 was repeated using 12.6 parts by weight of the aqueous solution of copolymer as used in Example 1, 400 parts by weight of melamine resin (ML-725, made by Honen Corporation) as used in Example 1, 500 parts by weight of water, 100 parts by weight of methanol, and 100 parts by weight of glycerin, with the reaction liquid adjusted to pH 6.5 with 50% acetic acid. Thus there was obtained 220 parts by weight of particles of crosslinked melamine resin in powder form having a uniform particle diameter of 7.1 $\mu$m. The particles had the structure as shown by a micrograph in FIG. 2.

EXAMPLE 4

Figure 3:
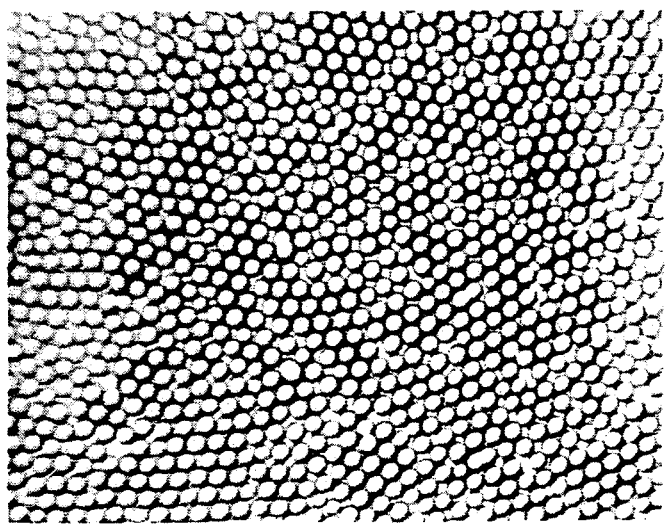
FIG. 3 is a micrograph showing the structure of the particles of crosslinked melamine resin obtained in Example 4.

The procedure for reaction in Example 1 was repeated using 13 parts by weight of the aqueous solution of copolymer as used in Example 1, 300 parts by weight of melamine resin (ML-725, made by Honen Corporation) as used in Example 1, and 800 parts by weight of water, with the reaction liquid adjusted to pH 5.7 with 10% acetic acid. Thus there was obtained 170 parts by weight of particles of crosslinked melamine resin in powder form having a uniform particle diameter of 6.0 $\mu$m. The solids content in the reaction liquid was 19.6%, and the amount of the protective colloid was 0.95 wt % of solids of melamine resin (ML-725, made by Honen Corporation). The particles had the structure as shown by a micrograph in FIG. 3.

EXAMPLE 5

The procedure for reaction in Example 1 was repeated using 13 parts by weight of the aqueous solution of copolymer as used in Example 1, 180 parts by weight of etherified melamine resin as used in Example 2, and 920 parts by weight of water, with the reaction liquid adjusted to pH 5.8 with 50% acetic acid. Thus there was obtained 110 parts by weight of particles of crosslinked melamine resin in powder form having a uniform particle diameter of 4.3 $\mu$m. The solids content in the reaction liquid was 13.1%, and the amount of the protective colloid was 1.4 wt % of the etherified melamine resin.

COMPARATIVE EXAMPLE 1

Reaction was carried out in the same manner as in Example 1 except that the aqueous solution of copolymer was replaced by 20 parts by weight of 10 wt % aqueous solution of acrylamide homopolymer. In the middle of the reaction, agglomeration took place, eventually giving rise to a single lump.

COMPARATIVE EXAMPLE 2

Reaction was carried out in the same manner as in Example 1 except that the melamine resin (ML-725, made by Honen Corporation) was replaced by a melamine-formaldehyde-water precondensate containing 50% solids and having a degree of etherification of 0%. The reaction gave rise to particles of crosslinked resin having uneven particle diameters, with a broad distribution from 1 to 100 $\mu$m.

COMPARATIVE EXAMPLE 3

Reaction was carried out in the same manner as in Example 5 except that the aqueous solution of copolymer was replaced by 10% aqueous solution of commercial polyvinyl alcohol (PVA-217) made by Kuraray Co., Ltd.. The reaction gave rise to some agglomerates as well as particles having uneven particle diameter over a broad distribution.

What is claimed is:

1. A process for producing particles of crosslinked melamine resin having a uniform particle diameter, said process comprising subjecting a water-soluble melamine-formaldehyde-methanol precondensate to the range of pH 5 to 8 in an aqueous solution containing a water-soluble polymer with carboxyl groups and amide groups with a curing catalyst, and performing a condensation reaction at 20° to 70° C. for 0.5 to 5.0 hours.

2. A process for producing particles of crosslinked melamine resin having a uniform particle diameter as claimed in claim 1, wherein said water-soluble melamine-formaldehyde-methanol precondensate has a ratio of methyl etherification higher than 10%.

3. A process for producing particles of crosslinked melamine resin having a uniform diameter as claimed in claim 1, wherein the aqueous solution containing a water-soluble polymer having carboxyl groups and amide groups is one or more polymers selected from the group consisting of
   a) a partial hydrolysate of at least one of acrylamide and methacrylamide polymer,
   b) a saponified product of acrylonitrile polymer, and
   c) a copolymer of at least one of acrylic acid and methacrylic acid or a sodium salt thereof with at least one of acrylamide and methacrylamide.

4. A process for producing particles of crosslinked melamine resin having a uniform particle diameter as claimed in claim 1, wherein the solids content in the reaction liquid is higher than 10 percent.

5. A process for producing particles of crosslinked melamine resin having a uniform particle diameter as claimed in claim 2, wherein the solids content in the reaction liquid is higher than 10 percent.

6. A process for producing particles of crosslinked melamine resin having a uniform particle diameter as claimed in claim 3, wherein the solids content in the reaction liquid is higher than 10 percent.

7. A process for producing particles of crosslinked melamine resin, said process comprising adjusting a water-soluble melamine-formaldehyde-methanol precondensate to the range of pH 5 to 8 in an aqueous solution containing a water-soluble polymer having carboxyl groups and amide groups with a curing catalyst, and performing a condensation reaction at 20° to 70° C. for 0.5 to 5.0 hours, wherein said process results in the formation of particles having a uniform particle diameter.

8. A process for producing particles of crosslinked melamine resin having a uniform diameter as claimed in claim 1, wherein said curing catalyst is an organic acid.

9. A process for producing particles of crosslinked melamine resin having a uniform particle diameter, said process consisting essentially of adjusting a water-soluble melamine-formaldehyde-methanol precondensate to the range of pH 5 to 8 in an aqueous solution containing a water-soluble polymer having carboxyl groups and amide groups with a curing catalyst, and performing a condensation reaction at 20° to 70° C. for 0.5 to 5.0 hours.

* * * * *